April 30, 1968     S. B. PITTS     3,381,298
HIGHLY DIRECTIVE ELECTRICALLY SMALL ANTENNA
Filed Dec. 23, 1965     3 Sheets-Sheet 1
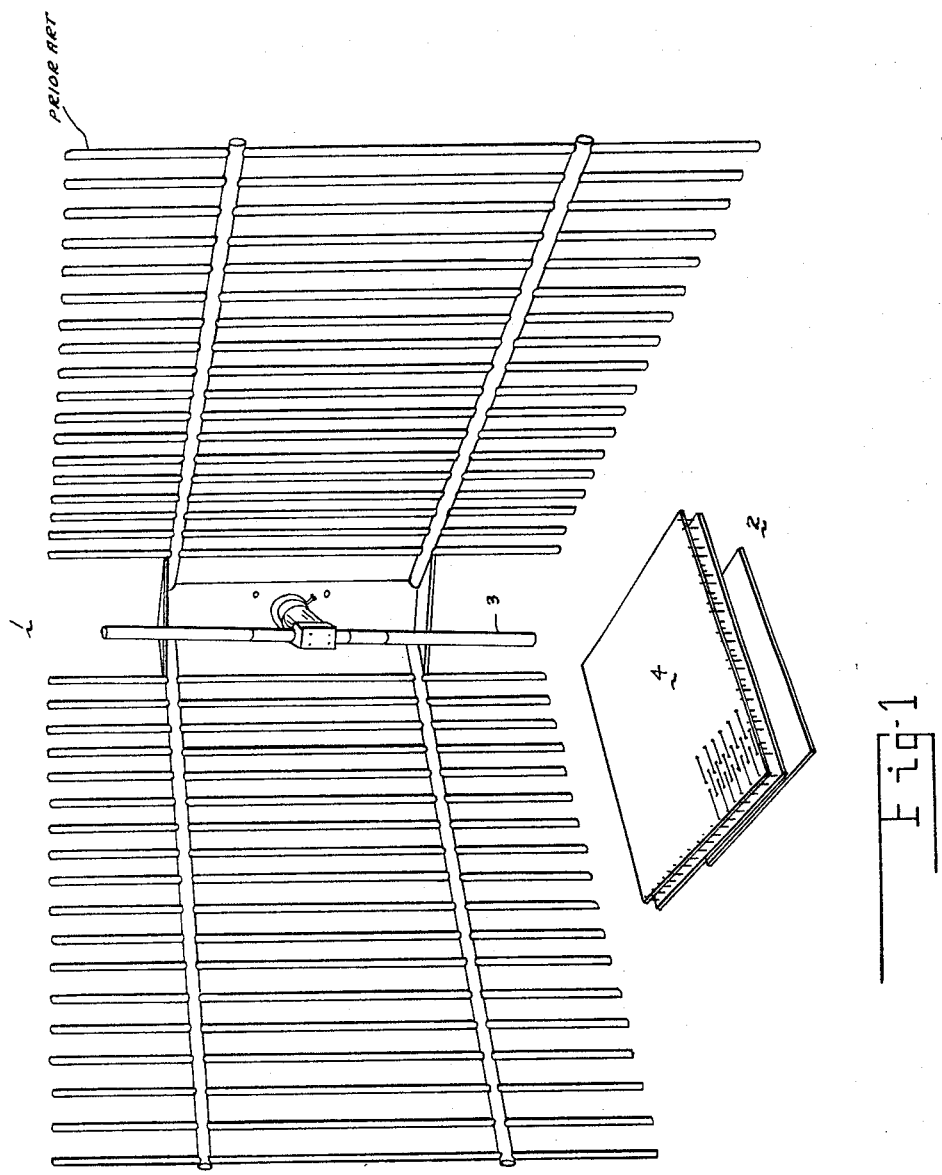
INVENTOR
STANLEY B. PITTS
BY Harry A. Herbert Jr. and Robert Kern Duncan
ATTORNEYS

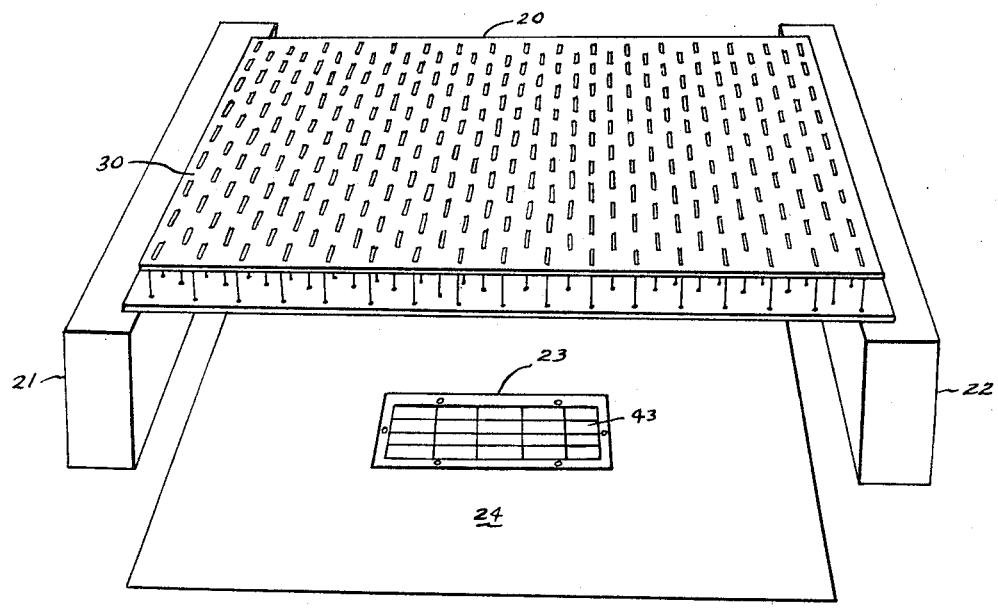
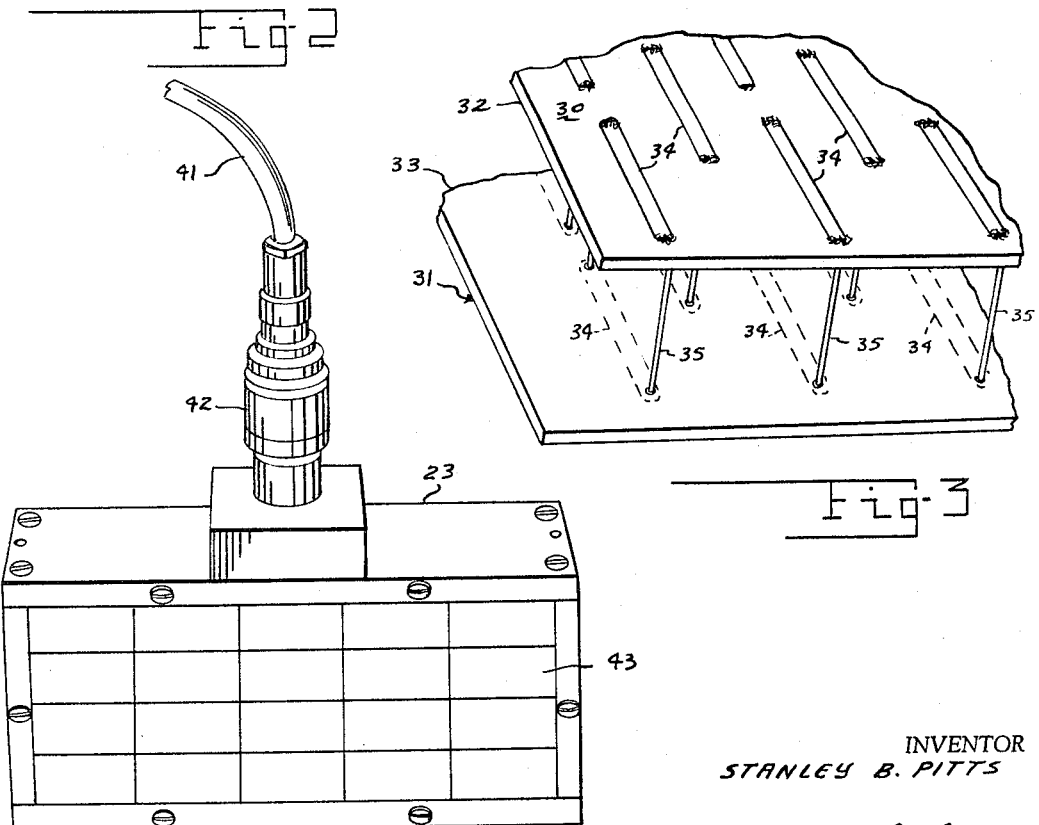
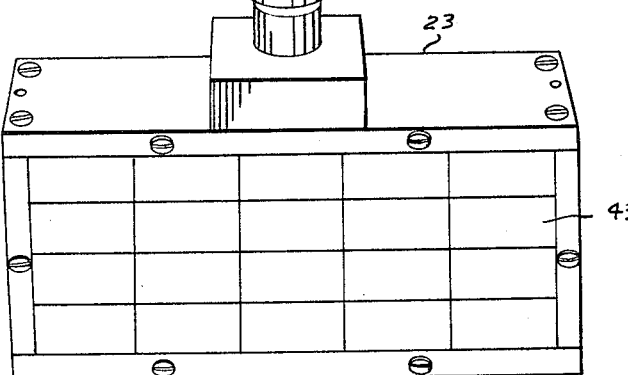

INVENTOR
STANLEY B. PITTS

BY Harry A. Herbert Jr
Robert Kern Duncan
ATTORNEYS

United States Patent Office 3,381,298
Patented Apr. 30, 1968

3,381,298
HIGHLY DIRECTIVE ELECTRICALLY SMALL ANTENNA
Stanley B. Pitts, Dayton, Ohio, assignor to the United States of America as represented by the Secretary of the Air Force
Filed Dec. 23, 1965, Ser. No. 516,172
10 Claims. (Cl. 343—753)

This invention relates to a high frequency electromagnetic wave radiating and receiving structure that achieves a directivity pattern equivalent to conventional structures which are many magnitudes larger in physical size. More particularly it relates to a passive feed-through array of radiating elements (termed a radiant) excited by a T-bar cavity loaded with a ferrite material.

Highly directional antennas are used to conserve energy, to lessen interference, to eliminate or lessen unwanted reflections, to limit the reception area, to increase the accuracy of direction finding systems, to limit the cross section area in echo area measuring systems, and in many other ways to improve the operation of electromagnetic wave radiating and receiving devices. Unfortunately to obtain this desired directivity antenna structures have had to be large bulky arrays of elements, or large reflective dishes, or large directive horns. In applications such as for aircraft and mobile ground equipment large structures are quite often prohibitive to the designed use of the parent vehicle or at least are highly undesirable. It is thus an object of the present invention to provide a compact directional antenna having the directional characteristics of conventional antennas that are many times larger in size.

It is another object of the present invention to provide a small highly directive antenna that has essentially a flush surface without protrusions.

It is another object of the present invention to provide a highly directional electromagnetic wave radiating and receiving antenna system that is electrically small in terms of the wavelength of the energy utilized by the system.

It is another object of the present invention to provide a small, highly directional antenna that has a flush surface that may be shaped to conform to the contour of the parent vehicle.

The novel features characteristic of the present invention, as well as additional objects and advantages thereof, will be better understood from the following detailed description when read in connection with the accompanying drawing, in which FIG. 1 is a pictorial view, to scale, showing an embodiment of the present invention compared with a conventional corner reflector, each providing approximately the same directivitiy at the same operating frequency.

FIG. 2 is a pictorial view of an embodiment of the invention showing the radant and the ferrite cavity in a ground plane, with the radant slightly displaced for illustration.

FIG. 3 is a pictorial view of a section of an embodiment of the radant.

FIG. 4 is a pictorial view of an embodiment of a coaxial fed ferrite loaded T-bar cavity for exciting the radant.

Figure 5:
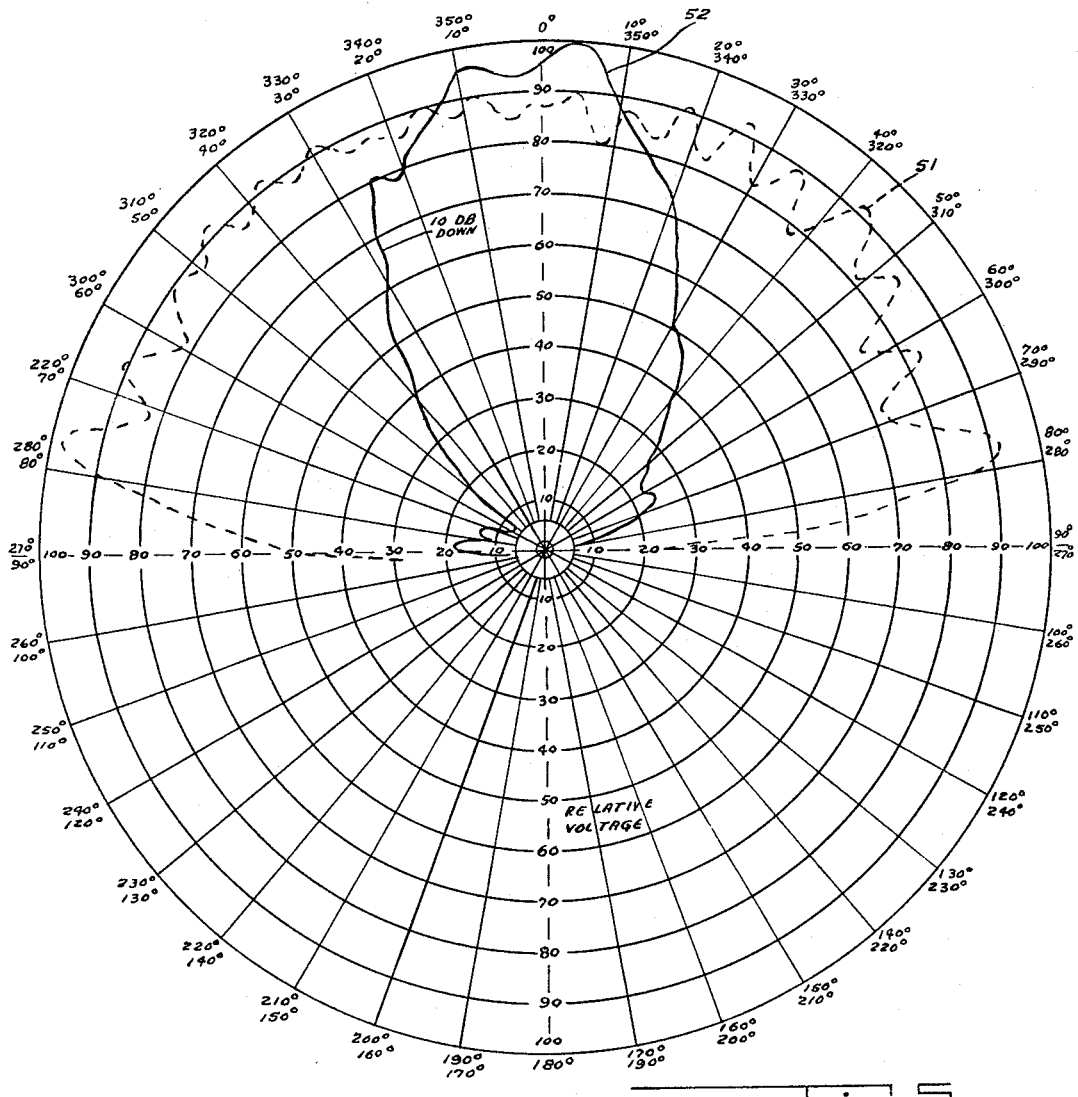
FIG. 5 is a polar plot of the directional characteristics of an embodiment of the present invention.

Referring to FIG. 1, a comparison is shown of the relative sizes of a prior art antenna 1 and the disclosed antenna 2. (For clarity, only a portion of the elements are shown on face 4.) Both antennas are for operation at the same frequency and have approximately the same directivity patterns. The disclosed antenna system is particularly suited for operation in the VHF band of frequencies (30 mc./s. to 300 mc./s.) and in the UHF band of frequencies (300 mc./s. to 3,000 mc./s.). The size of directional antenas in the frequency range of 100 mc./s. to 1000 mc./s. has been very serious problem and it is in this range of frequencies that this invention is particularly suited. In FIG. 1 the prior art antenna 1 is a conventional corner reflector type antenna system with dipole radiator 3. The disclosed directional antenna system 2 has an approximately square radiating surface 4 which is approximately eighteen inches on a side. Both are used for frequencies at or near 600 mc./s. It is to be understood that both the prior art antenna system and the disclosed antenna system may be used for both transmitting and receiving purposes, and that the directional characteristics apply to both modes of use. While radiation and other derivatives of the term "radiate" generally connote a transmitting mode, in antenna usage it is understood that the terms may also apply to the reception mode.

In FIG. 2 a pictorial view of an embodiment of the antenna system is shown. The radant 20 is shown resting on supporting blocks 21 and 22. In general usage the upper surface 30 is positioned flush with the outside surface of the parent vehicle and may be contoured to conform with the shape of that surface. The ferrite loaded cavity 23 and its surrounding ground plane 24 are shown lowered down and pulled forward for illustrative purposes. The proper positioning of the cavity and ground plane will be set forth later. An enlarged view of a section of the corner of the radant 20 of FIG. 2 is shown in FIG. 3. The upper surface 30 and the lower surface 31 of the radant are identical. In this illustrated embodiment for operation at approximately 600 mc./s., the insulating supporting surfaces 32, and 33 are one-eighth inch thick copper-clad fiber board approximately eighteen inches square. The active electromagnetic radiating elements 34 are etched copper strips approximately one-eighth inch wide and approximately one and one-half inches long. The elements in this embodiment are etched in the form of segments of parallel lines each element spaced approximately one-half inch from the in-line adjacent elements and the parallel lines of elements are spaced approximately one inch apart. The segments in adjacent parallel lines are offset approximately one-half an element length. Thus for this embodiment each surface contains approximately two hundred eighty-nine elements. The number and size of elements are not critical, other than that a plurality of elements be employed and their physical size be small compared to the desired operating wavelength. It has been found desirable to use elements having fairly large length-to-width ratios, and that the strips of elements be arranged in parallel rows. Rhombic and diamond-shaped elements have been found to be less effective than strip-type elements. The staggering of adjacent rows is not critical but does tend to make construction easier. A small hole is drilled in each end of each copper strip, through the insulating board, so that electrically conducting wires 35, which are approximately one inch long, may be soldered to the ends of the copper strips. Number 16 AWG wire size has been found to be satisfactory in this embodiment. Thus the radant forms a network configuration of feed-through parallel magnetic loop circuits, wherein the electromagnetic energy incident on one side of the radant structure excites currents on each copper strip on that surface and then these currents flow to the opposite side of the radant via the wire matrix of transmission lines, and the energy is then re-radiated in electromagnetic wave form from the corresponding strips on the opposite radant surface. As the elements on one side of the radant are a normal projection in one-to-one correspondence of the elements on the other side, either surface may be faced toward the ferrite loaded cavity or in the direction of the radiated (or on-coming) wave.

The T-bar ferrite cavity 23, FIG. 2 and FIG. 4, cooperates by electromagnetic coupling with the radant and it is from the radiating element within the loaded cavity that the received electrical signal is extracted or the signal to be transmitted is injected. In the embodiment illustrated the electrical signal enters and leaves the ferrite cavity through the coaxial line 41 and coaxial connector 42.

Ferrite loaded, T-bar fed, cavities as radiating (and receiving) elements are relatively new, but known in the electromagnetic wave art. Slot and cavity type elements are particularly suitable to being "loaded." This is a technique whereby the antenna element is filled with a dielectric or magnetic material. The former constitutes electric loading, and the latter magnetic loading. Both of these techniques are based on the principle of reducing the velocity of the electromagnetic fields in or on the electrical to electromagnetic (or vice versa) transducing element, which reduces the physical length of the element with respect to its effective wavelength of operation. Therefore a given physical size element appears electrically to be larger than it is in terms of wavelengths. The T-bar fed, ferrite loaded cavity used in the illustrated embodiment of this highly directive electrically small antenna system is shown in FIG. 4. The aperture (or face) 43 is three inches by five inches, and the depth of the unit is three and one-fourth inches. The cavity is filled with a pressed block ferrite material having a low conductivity and a relative permeability-permittivity product of approximately 8.3. The composition of typical ferrite loading material that has been used in this embodiment has the following ratios of materials: nickle, 1.00 unit; zine 0.9696; cobalt, 0.0404; iron, 0.03; aluminum 1.84; oxygen ($O_4$) 0.04. The nominal impedance of the operating embodiment of FIG. 4 is fifty ohms.

It has been found desirable to surround the aperture of the cavity with a ground plane 24 as shown in FIG. 2. The size of the ground plane is not critical. In this embodiment it is made approximately the same size and shape as the surface of the radant.

Electromagnetic wave propagation is conventionally described as taking place in planes perpendicular to the wave front designated as the E-plane and the H-plane. In this system the E-plane pattern delineates the electric field distribution in the perpendicular plane across the narrow dimension of the aperture 43. The H-plane pattern delineates the electrical field distribution in the perpendicular plane across the wide dimension of the aperture. The ferrite cavity of this embodiment when used singly, operates satisfactorily over approximately a two-to-one bandwidth with some variations in input impedance.

The electrically small highly directive antenna herein disclosed is a unique combination of the ferrite cavity antenna (it may be used singly as an antenna) and the radant structure. In this embodiment the radant structure is placed symmetrically over the ferrite cavity with the copper strips parallel to the narrow cavity dimension, i.e. the strips are parallel to the E-plane. The combined system may be considered as a ferrite cavity antenna, feeding a radant structure which receives the energy, transmits it through, focuses it, and reradiates it from the outside surface of the radant.

The H-plane radiation pattern from the ferrite loaded cavity is more directive than the E-plane pattern and it (the H-plane pattern) is relatively unaffected by the presence of the radant. Curve 51 of FIG. 5 is a plot of the radiation in the E-plane from the illustrated cavity of this embodiment, without the presence of the radant. With optimum spacing of the illustrated radant, which is approximately one inch between the aperture with its surrounding ground plane and the adjacent surface of the radant, the directivity in the E-plane is improved as shown by curve 52. It is to be noted that 10 db attenuation was inserted in the measuring system in obtaining curve 52. FIG. 5 clearly shows the directivity effect of the radant on the E-plane radiation from the cavity; curve 51 being without the radant and curve 52 (plotted 10 db down) being with the radant in place.

Figure 6:
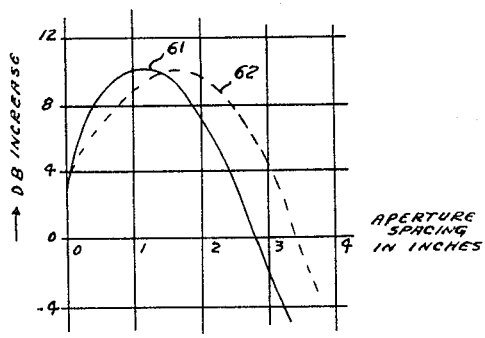
FIG. 6 is a curve showing the relationships of the on-axis sensitivity of the antenna system with the radant thickness and with the radant to cavity aperture spacing.

Experimentally, it has been determined that the directivity depends on the distance the radant is spaced off the cavity aperture and the thickness of the radant itself (that is, the distance between the two surfaces of elements). In this embodiment the foregoing is shown in FIG. 6. Curve 61 shows the db increase, over the cavity alone, for a radant with one inch separation between the copper strips of the two surfaces, plotted against the separation in inches between the cavity aperture and the adjacent radant surface. Curve 62 shows the effect on directivity with changing the separation between the surfaces of the radant to five-eighths inch. In this embodiment a maximum increase in the on-axis signal strength (maximum directivity) occurred with one inch spacing between surfaces and one inch spacing off the cavity aperture as shown by the curve 61 of FIG. 6; and as shown by FIG. 5 and FIG. 6, this increase amounted to approximately 10 db. Also as is shown by FIG. 6 a directivity increase of approximately 9.5 db may be obtained with the surfaces of elements of the radant structure spaced ⅝ inch apart separated two inches off the cavity aperture. Radant spacings of three inches or greater gave no appreciable focusing effect. At these distances (three inches and over) the radant appears to become an aperture blocking device causing only distortion and attenuation of the radiated field.

While the principles of the invention in connection with specific apparatus have been described, it is to be understood that this description is made by way of example only and not as a limitation to the scope of the invention as set forth in the accompanying claims.

What is claimed is:

1. A compact directional high-frequency antenna system for electromagnetic wavelengths in the VHF and UHF spectrum comprising: a first plurality of electrically conductive elements; means for positioning the said first plurality of electrically conductive elements to form a first surface of elements with each element in electrically insulated relationship; a second plurality of electrically conductive elements of essentially the same physical shape and numerically equal in number to the said first plurality of electrically conductive elements; means for positioning the said second plurality of electrically conductive elements to form a second surface of elements with each element in electrically insulated relationship, and with each element in the said second surface being in a position of normal projection of one-to-one correspondence with a corresponding element of the said first surface and each element of the said second surface being at an equal predetermined distance from the respective corresponding element of the said first surface; electrical means for connecting the ends of each of the said elements of the first surface with the corresponding end of the corresponding element of the said second surface; and means including a T-bar ferrite cavity cooperating with the said second surface of elements whereby the said first surface of elements has directional electromagnetic wave characteristics.

2. The antenna system as claimed in claim 1 wherein the said T-bar ferrite cavity includes a surrounding ground plane having approximately the same peripheral surface dimensions as the said second surface of elements.

3. The antenna system as claimed in claim 2 wherein the said predetermined distance between the elements of the second surface and the elements of the first surface is a small fraction of the said wavelength.

4. The antenna system as claimed in claim 2 wherein the said T-bar ferrite cavity and ground plane are essentially parallel to the said second surface and spaced apart from the said second surface a small fraction of the said wavelength.

5. The antenna system as claimed in claim 4 wherein the said predetermined distance between the elements of the second surface and the elements of the first surface is a small fraction of the said wavelength.

6. The antenna system as claimed in claim 5 wherein the said first plurality of electrical conductive elements are strips having a length dimension and a width dimension, the said length dimension being greater than the said width dimension.

7. The antenna system as claimed in claim 6 wherein the means for positioning the said first plurality of electrically conductive elements includes means for positioning the said first plurality of electrically conductive elements with their length dimension in segments of parallel lines relationship.

8. The antenna system as claimed in claim 7 wherein the said ferrite loaded T-bar cavity has an electromagnetic field pattern described by an E plane and an H plane and wherein the said E plane of the said T-bar cavity is positioned parallel to the said length dimension of the said elements in the said first surface.

9. A compact directional antenna system for electromagnetic wavelengths in the VHF and UHF spectrum, the said system comprising: a first plurality of electrically conductive elements, each of the said elements being a thin, narrow conductive strip having a length of less than $\frac{1}{10}$ wavelength; a first positioning means for positioning the said first plurality of elements in individually insulated relationship with their length dimension in segments of parallel lines relationship to provide a surface of elements having a surrounding peripheral edge length of less than two wavelengths; a second plurality of electrically conductive elements numerically equal in number and essentially identical in physical shape to the said first plurality of electrically conductive elements; means for positioning the said second plurality of electrically conductive elements to provide a second surface of elements essentially parallel with the said first surface of elements, with each element in electrically insulated relationship, with each element in the said second surface being in a position of normal projection of one-to-one correspondence with a corresponding element of the said first surface of elements, and with each element of the said second surface spaced apart from its corresponding element in the said first surface by a distance less than $\frac{1}{20}$ wavelength; electrical conducting means for electrically connecting the ends of each of the said elements of the said first surface of elements with the corresponding end of the corresponding element in the said second surface of elements; a ferrite loaded T-bar cavity having a radiation aperture, cooperating by electromagnetic wave coupling with the said second surface of elements; positioning means for positioning the said radiation aperture in essentially parallel relationship to the said second surface of elements and spaced apart from the said second surface of elements by a distance of less than $\frac{1}{20}$ wavelength; ground plane means essentially parallel to the said second surface of elements surrounding the said aperture; and electrical signal connection means cooperating with the said T-bar cavity.

10. A radant for increasing the electromagnetic wave directivity characteristics in the E plane from the aperture of a ferrite loaded T-bar cavity having an electromagnetic field pattern from the cavity aperture described by an E plane characteristic and an H plane characteristic, the said cavity and radant operating at a predetermined wavelength in the electromagnetic wave spectrum contained in the VHF and UHF bands of frequencies; the said radant comprising: a first plurality of electrically conductive elements, each of the said elements being a thin narrow conductive strip having a length of less than $\frac{1}{10}$ of the said predetermined wavelength; a first positioning means for positioning the said first plurality of elements in individually insulated segments of parallel lines relationship, to provide a surface of elements, the said surface of elements having a peripheral edge length of less than twice the said predetermined operating wavelength; a second plurality of electrically conductive elements, numerically equal in number and essentially identical in physical shape to the said first plurality of electrically conductive elements; means for positioning the said second plurality of electrically conductive elements to provide a second surface of elements essentially parallel with the said first surface of elements, with each element in electrically insulated relationship, with each element in the said second surface being in a position of normal projection of one-to-one correspondence with a corresponding element of the said first surface of elements, and with the said second surface of elements being spaced apart from the said first surface of elements by a distance of less than $\frac{1}{20}$ of the said predetermined wavelength; electrical conducting means for electrically connecting the ends of each of the said elements of the said first surface of elements with the corresponding end of the corresponding element in the said second surface of elements; and positioning means for positioning the said second surface of elements in essentially parallel spaced apart relationship to the said aperture of the said cavity at a distance of less than $\frac{1}{20}$ of the said predetermined operating wavelength with the said segments of parallel lines relationship of the said elements of the said second surface of elements parallel to the said E plane of the said cavity.

References Cited

UNITED STATES PATENTS 3,214,760  10/1965  Yonkers _____ 343—753

ELI LIEBERMAN, *Primary Examiner.*

M. NUSSBAUM, *Assistant Examiner.*